United States Patent
Kuo et al.

(10) Patent No.: US 12,488,499 B2
(45) Date of Patent: Dec. 2, 2025

(54) POSITIONING METHOD, OPERATING METHOD AND POSITIONING DEVICE

(71) Applicant: INDUSTRIAL TECHNOLOGY RESEARCH INSTITUTE, Hsinchu (TW)

(72) Inventors: Hui-Ping Kuo, Hsinchu (TW); Yi-Ming Wu, New Taipei (TW); Wen-Fang Cheng, Yuanlin (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 393 days.

(21) Appl. No.: 18/089,875

(22) Filed: Dec. 28, 2022

(65) Prior Publication Data
US 2024/0221211 A1 Jul. 4, 2024

(51) Int. Cl.
*G06T 7/73* (2017.01)
*G06K 7/14* (2006.01)

(52) U.S. Cl.
CPC ........... *G06T 7/74* (2017.01); *G06K 7/1417* (2013.01); *G06T 2207/30204* (2013.01); *G06T 2207/30244* (2013.01)

(58) Field of Classification Search
CPC ........... G06T 7/74; G06T 2207/30244; G06T 2207/30204; G06T 7/70; G06T 7/73; G06K 7/1417; G06K 7/1443; G06V 10/245
(Continued)

(56) References Cited

U.S. PATENT DOCUMENTS 7,671,875 B2 * 3/2010 Anabuki .................. G06T 7/73
  345/632
8,231,465 B2 7/2012 Yee et al.
(Continued)

FOREIGN PATENT DOCUMENTS

CA 2898668 A1 * 7/2014 ......... G06K 9/00671
CN 107024199 A 8/2017
(Continued)

OTHER PUBLICATIONS

Zhao, Fangda, et al. "Marker-based non-overlapping camera calibration methods with additional support camera views." Image and Vision Computing 70 (2018): 46-54 (Year: 2018).*
(Continued)

*Primary Examiner* — Henok Shiferaw
*Assistant Examiner* — Toluwani Mary-Jane Ijaseun
(74) *Attorney, Agent, or Firm* — Birch, Stewart, Kolasch & Birch, LLP

(57) ABSTRACT

A positioning method comprises the following. Detecting an image marker and receiving an additional information, wherein a first pose information of a first positioning device relative to a target anchor point is included in the additional information, the first positioning device and the target anchor are outside a first positioning space, and a second positioning device is in the first positioning space. Obtaining a second pose information of the second positioning device relative to the first positioning device according to the image marker. Obtaining a positioning-pose information of the second positioning device in the first positioning space through a positioning means which is different from an image marker detection means. Obtaining the target pose information of the target anchor relative to the first positioning space according to the first pose information, the
(Continued)

second pose information and the positioning-pose information.

17 Claims, 5 Drawing Sheets

(58) Field of Classification Search
USPC .................................................. 382/103, 382
See application file for complete search history.

(56) References Cited

U.S. PATENT DOCUMENTS

| | | | |
|---|---|---|---|
| 9,282,326 | B2 | 3/2016 | Olson et al. |
| 9,830,491 | B2 | 11/2017 | Laurent et al. |
| 9,953,461 | B2 | 4/2018 | Huang et al. |
| 11,087,545 | B2 * | 8/2021 | Dai .......................... G06T 19/20 |
| 11,090,561 | B2 | 8/2021 | Cahill et al. |
| 11,100,649 | B2 | 8/2021 | Fiala |
| 11,534,627 | B2 | 12/2022 | Maltz et al. |
| 2018/0046874 | A1* | 2/2018 | Guo ...................... G06V 10/507 |
| 2018/0089841 | A1* | 3/2018 | Dai .......................... G01P 3/38 |
| 2020/0098131 | A1 | 3/2020 | Rivera et al. |
| 2021/0152802 | A1 | 5/2021 | Varekamp et al. |
| 2022/0083071 | A1* | 3/2022 | Fang ........................ G01S 1/703 |
| 2022/0245851 | A1* | 8/2022 | Xu ............................ G06T 7/97 |

FOREIGN PATENT DOCUMENTS

| | | | |
|---|---|---|---|
| CN | 108986163 | A | 12/2018 |
| CN | 111813148 | A | 10/2020 |
| CN | 114545426 | A * | 5/2022 |
| EP | 3 904 992 | A1 | 11/2021 |
| TW | 201518711 | A | 5/2015 |
| TW | M545254 | U | 7/2017 |
| TW | 201820083 | A | 6/2018 |
| TW | 201912112 | A | 4/2019 |
| TW | 201915445 | A | 4/2019 |
| WO | WO-2018135701 | A1 * | 7/2018 ............... G06T 7/70 |

OTHER PUBLICATIONS

Sarmadi, Hamid, et al. "Simultaneous multi-view camera pose estimation and object tracking with squared planar markers." IEEE Access 7 (2019): 22927-22940 (Year: 2019).*

Abbas et al., "Analysis and Improvements in AprilTag Based State Estimation", Sensors, 2019, vol. 19, No. 5480, pp. 1-32.

Klopschitz et al., "Automatic Reconstruction of Wide-Area Fiducial Marker Models", IEEE Xplore, Dec. 2007, total 4 pages.

Nahangi et al., "Automated Localization of UAVs in GPS-Denied Indoor Construction Environments Using Fiducial Markers", 35th International Symposium on Automation and Robotics in Construction (ISARC 2018), 2018, total 7 pages.

Nissler et al., "Evaluation and Improvement of Global Pose Estimation with Multiple AprilTags for Industrial Manipulators", 2016 IEEE 21st International Conference on Emerging Technologies and Factory Automation (ETFA), 2016, total 8 pages.

Richardson et al., "AprilCal: Assisted and repeatable camera calibration", 2013 IEEE/RSJ International Conference on Intelligent Robots and Systems (IROS), Nov. 3-7, 2013, pp. 1814-1821.

Xu et al., "An Extensible Positioning System for Locating Mobile Robots in Unfamiliar Environments", Sensors, 2019, vol. 19, No. 4025, pp. 1-21.

* cited by examiner

POSITIONING METHOD, OPERATING METHOD AND POSITIONING DEVICE

BACKGROUND OF THE INVENTION

Field of the Invention

The disclosure relates in general to a positioning method, an operating method and a positioning device.

Description of the Related Art

In the multi-person and multi-viewpoint interaction of Mixed Reality, each user can experience the objects in the Mixed Reality according to the pose information and the location information among operating terminals, so as to enable the user to achieve an immersive effect.

Using different positioning technologies for different equipment and requirements, and fusing multiple positioning spaces for the field arrangement are one of the trends.

SUMMARY OF THE DISCLOSURE

The disclosure relates to a positioning method, an operating method and a positioning device.

According to a first aspect of the present disclosure, a positioning method is provided. The positioning method comprises: detecting an image marker and receiving an additional information, wherein a first pose information of the first positioning device relative to a target anchor point is included in the additional information, the first positioning device and the target anchor point are outside a first positioning space, and detecting the image marker and receiving the additional information is performed by a second positioning device in the first positioning space; obtaining a second pose information of the second positioning device relative to the first positioning device according to the image marker by the second positioning device; obtaining a positioning-pose information of the second positioning device in the first positioning space by the second positioning device through a positioning means different from an image marker detection means; and obtaining the target pose information of the target anchor point relative to the first positioning space according to the first pose information, the second pose information and the positioning-pose information by the second positioning device.

According to a second aspect of the present disclosure, an operating method is provided. The operating method comprises: detecting an image marker by a terminal device to obtain a positioned reality space, wherein the image marker detected by the terminal device is generated based on the target pose information in the positioning method according to the first aspect of the present disclosure.

According to a third aspect of the present disclosure, a positioning device is provided, and it is disposed in a first positioning space. The positioning device comprises a positioning unit, a camera unit and a computing unit. The positioning unit is configured to obtain a positioning-pose information of another positioning device in the first positioning space through a positioning means. The camera unit is configured to detect an image marker displayed by another positioning device outside the first positioning space. The computing unit is configured to obtain a second pose information of the positioning device relative to the another positioning device according to the image marker, and configured to obtain a target pose information of the target anchor point relative to the first positioning space according to an additional information, the second pose information and the positioning-pose information, wherein the additional information includes a first pose information of the another positioning device relative to the target anchor point.

The disclosure will become apparent from the following detailed description of the preferred but non-limiting embodiments. The following description is made with reference to the accompanying drawings.

DETAILED DESCRIPTION OF THE INVENTION

Figure 1A:
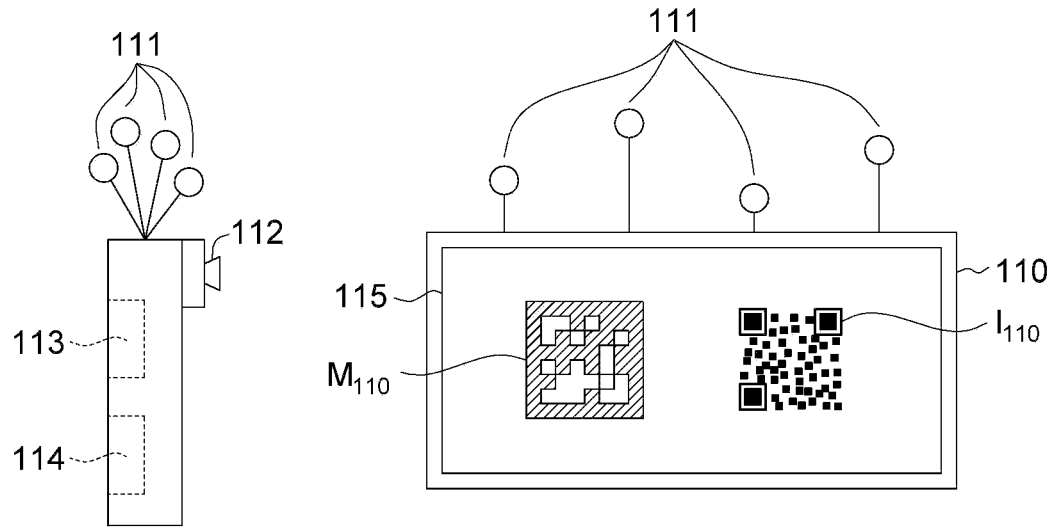
FIG. 1A is a schematic diagram of a first positioning device used in the positioning method according to an embodiment of the present disclosure.

The embodiments of the present disclosure will be described in detail below, together with the drawings as examples. In addition to these detailed descriptions, the present disclosure may also be widely implemented in other embodiments, and any simple replacement, modification and equivalent change of the described embodiment(s) are included in the scope of the present disclosure.

In the following detailed description, for purpose of explanation, numerous details are set forth in order to provide a thorough understanding of the disclosed embodiments. However, the disclosure may be practiced under omitting some or all of these details. Also, well-known steps and elements are not described in detail in order to avoid unnecessarily limitation to the present disclosure. The same or similar elements in the drawings have the same or similar reference signs. It should be noted that the drawings are for illustrative purpose only and do not mean the actual size or quantity of elements, unless otherwise described.

According to one embodiment of the disclosure, through a pose information combination of a positioning device inside a positioning space and another positioning device outside the positioning space, a pose information corresponding to a target anchor point outside the positioning space may be integrated into the positioning space and be correctly positioned.

Figure 1B:
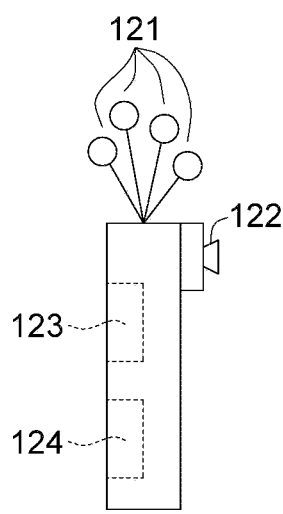
FIG. 1B is a schematic diagram of a second positioning device used in the positioning method according to an embodiment of the present disclosure.

Please refer to FIG. 1A to FIG. 1B. FIG. 1A shows a schematic diagram of a first positioning device 110 used in the positioning method of an embodiment of the present disclosure, wherein the first positioning device 110 is shown along two orientations. FIG. 1B shows a schematic diagram of a second positioning device 120 used in the positioning method according to an embodiment of the present disclosure.

The first positioning device 110 may be used in the field of Mixed Reality, and may comprise a positioning unit 111, a camera unit 112, a communication unit 113, a computing unit 114 and/or a display unit 115. The positioning unit 111 may be configured to obtain a position information of the first positioning device 110. The camera unit 112 may be configured to detect a target anchor point or an image feature of another first positioning device. The computing unit 114 may be configured to calculate to obtain a pose information of the first positioning device 110 relative to the target anchor point or to another first positioning device 110 according to the image feature of the target anchor point or the another first positioning device and the position information of the first positioning device 110. For example, the pose information is an information, regarding a position (such as distance, orientation and/or coordinates, etc.) and/or a rotation angle, of camera unit 112 of the first positioning device 110 and/or the first positioning device 110 relative to the target anchor point or the other first positioning device in space.

As shown in FIG. 1A, the display unit 115 is, for example, a display screen and may be configured to output (such as, display) an image marker $M_{110}$. For example, the image marker $M_{110}$ is in the form of Fiducial Marker. In an embodiment, the display unit 115 may also be configured to output (such as, display) an additional information including the aforementioned pose information, and the additional information is displayed on the display unit 115 in the form of the two-dimensional code image $I_{110}$ in FIG. 1A. In an embodiment, the communication unit 113 may also be configured to output additional information including the pose information, and the additional information is uploaded to a server through the communication unit 113 in the form of a data packet, or sent to the second positioning device 120 or another first positioning device 110. In an embodiment, the first positioning device 110 includes a memory unit (not shown), which may be configured to store the position information, the additional information, the image marker, the two-dimensional code image, the identification information, the size information and/or the pose information.

The second positioning device 120 may be used in the field of Mixed Reality and may comprise a positioning unit 121, a camera unit 122, a communication unit 123 and/or a computing unit 124. The positioning unit 121 may be configured to obtain a positioning-pose information of the second positioning device 120 in a positioning space through a positioning means, namely the second positioning device 120 is disposed in the positioning space. For example, the positioning means used by the positioning unit 121 is Motion Capture, namely the positioning unit 121 obtains the positioning-pose information through Motion Capture. The positioning-pose information is the coordinate and rotation angle relative to the positioning space.

The camera unit 122 may be configured to detect an image marker displayed by another positioning device (such as the first positioning device 110) outside the positioning space. This image marker is, for example, the image marker $M_{110}$ displayed by the aforementioned first positioning device 110. In an embodiment, the communication unit 123 may be configured to receive an additional information from another positioning device or a server, such as the additional information from the aforementioned first positioning device 110. In an embodiment, the additional information may be displayed on the first positioning device 110 in the form of a two-dimensional code image $I_{110}$, and the camera unit 122 may be configured to capture and/or scan the two-dimensional code image $I_{110}$ to obtain the additional information from the first positioning device 110.

In an embodiment, when the additional information is uploaded to or stored in the server by the first positioning device 110, the communication unit 123 or another first positioning device may download the additional information of the first positioning device 110 from the server.

For example, the positioning unit 111 and/or the positioning unit 121 use a positioning means of a satellite positioning system (such as Global Positioning System, GPS), Motion Capture, Fiducial Marker, or other positioning means. In an embodiment, the positioning unit 111 and/or the positioning unit 121 includes a GPS locator, a gyroscope or an accelerometer.

For example, the camera unit 112 and/or the camera unit 122 may be a video camera or a photo camera.

The communication unit 113 and/or the communication unit 123 may be a computing circuit or a computing processor, such as Central Processing Unit (CPU), microprocessor, processor, Microcontroller Unit (MCU), Application Specific Integrated Circuit (ASIC), Field Programmable Gate Array (FPGA) and/or any hardware and/or software components that may execute processes, methods or operations. The communication unit 113 and/or the communication unit 123, for example, may perform communication based on Bluetooth protocol, Universal Asynchronous Receiver/Transmitter (UART) protocol, Zigbee protocol, the cellular network communication protocol (also known as mobile communication network protocol), New Radio (NR), Long Term Evolution (LTE), LTE-advanced (LTE-A), Worldwide Interoperability for Microwave Access (WiMAX), Wireless LAN (WLAN), or Code Division Multiple Access (CDMA).

The computing unit 114 and/or the computing unit 124 may be a computing circuit or a computing processor, such as Central Processing Unit (CPU), microprocessor, processor, Microcontroller Unit (MCU), Application Specific Integrated Circuit (ASIC), Field Programmable Gate Array (FPGA) and/or any hardware device that may execute processes, methods or operations.

The display unit 115 may be a display, such as liquid crystal display, Light-Emitting Diode (LED) display or Organic Light-Emitting Diode (OLED) display.

The memory unit may be a volatile memory or a non-volatile memory, such as random access memory, read-only memory, flash memory, or hard disk or solid-state hard disk.

Figure 2:
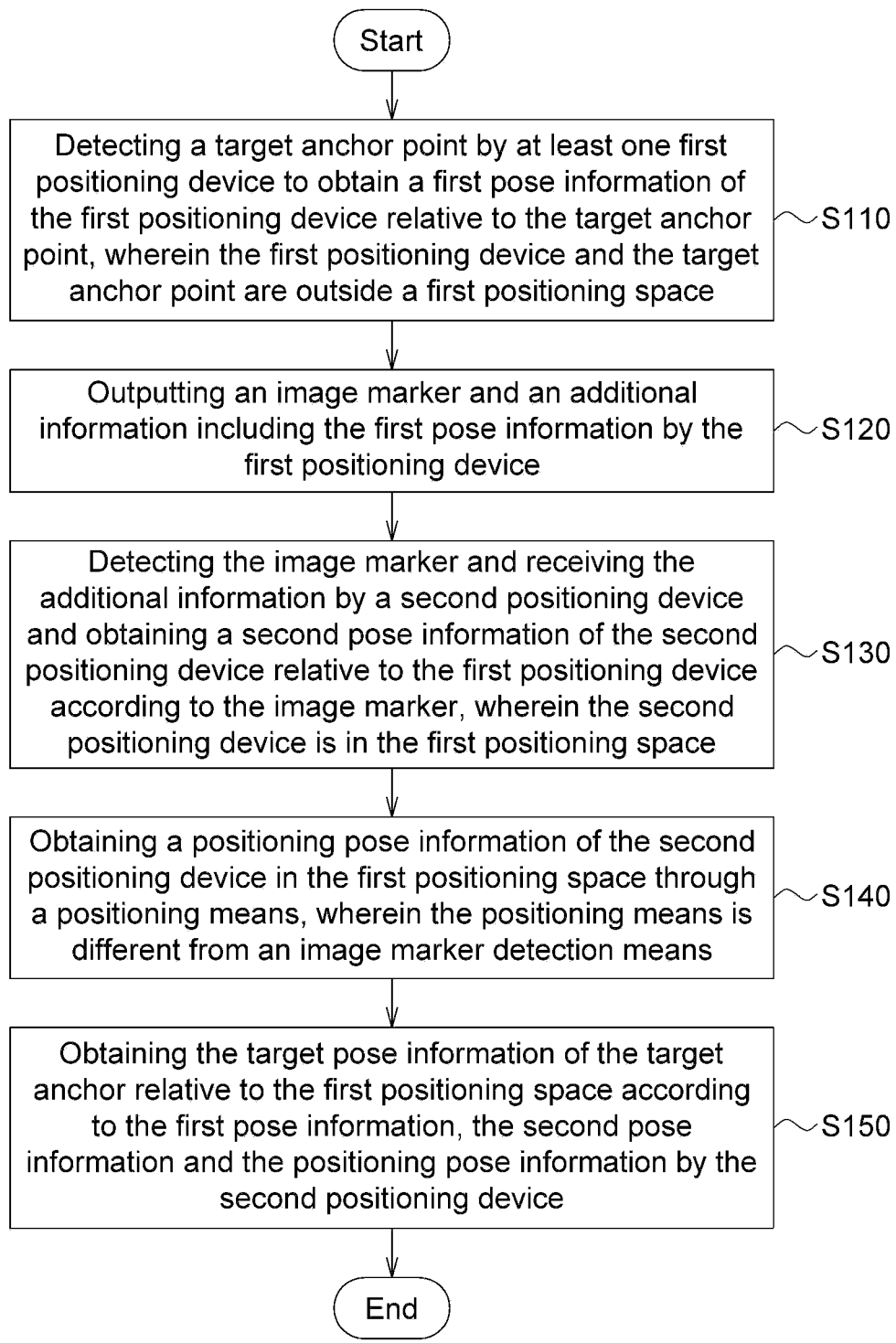
FIG. 2 is a flow chart of the positioning method according to an embodiment of the present disclosure.
Figure 3:
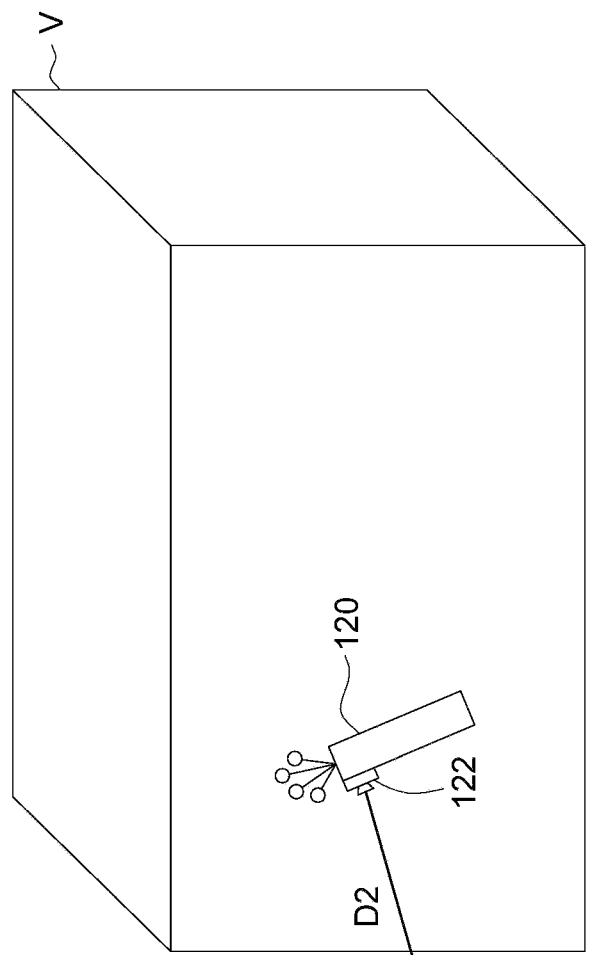
FIG. 3 is an application diagram of the positioning method according to an embodiment of the present disclosure.
Figure 3:
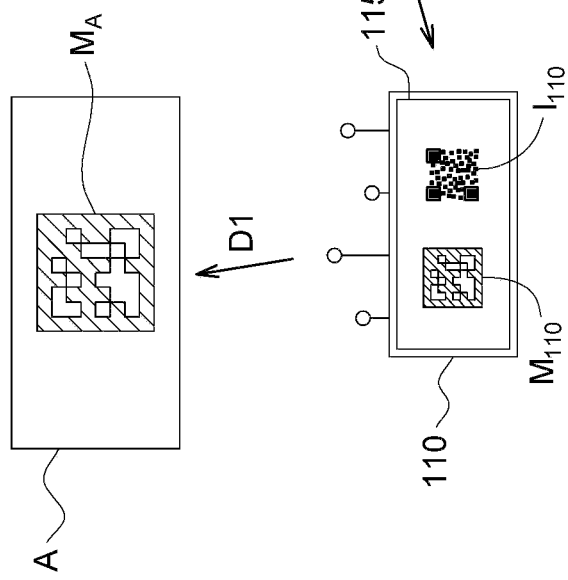

Please refer to FIG. 2 to FIG. 3. FIG. 2 shows a flow chart of a positioning method according to an embodiment of the present disclosure, and FIG. 3 shows an application diagram of the positioning method according to an embodiment of the present disclosure. In an embodiment, the positioning means in the positioning space V is different from the positioning means outside the positioning space. For example, Motion Capture may be used in the positioning space V, high-speed camera(s) may be installed around the positioning space V to capture the pre-calibrated and installed reflective balls to obtain the position and pose of the device in the positioning space V, so as to obtain accurate and reliable control of the device positioning. Fiducial Marker may be used for the positioning outside the positioning space V. The lens of the device outside the positioning space V is configured to detect the Fiducial Marker to perform positioning and to estimate the relative positional relationship between the Fiducial Marker and the device. In an embodiment, the devices in the positioning space V do not know the positioning-pose information of the devices outside the positioning space V. For example, the second positioning device 120 does not know the positioning-pose information of the target anchor point A. In this embodiment, the following positioning method is performed by the first positioning device 110 and the second positioning device 120 described in FIG. 1A and FIG. 1B, and the positioning method is described as follows.

In step S110, perform detecting a target anchor point A by the first positioning device 110 to obtain a first pose information of the first positioning device 110 relative to the target anchor point A. As shown in FIG. 3, both the first positioning device 110 and the target anchor point A are outside the first positioning space V, and the target anchor point A may include an image marker $M_A$. For example, the image marker $M_A$ of the target anchor point A may be in the form of a Fiducial Marker. The first positioning device 110 may detect (for example, capture) the image marker $M_A$ on the target anchor point A along the orientation D1 to obtain the first pose information. The first pose information includes an information such as the coordinate and rotation angle. In an embodiment, the image marker $M_{110}$ of the first positioning device 110 is the same as the image marker $M_A$ of the target anchor point. In an embodiment, the shape of the image marker $M_{110}$ of the first positioning device 110 is the same as that of the image marker $M_A$ of the target anchor point, but different in size or rotation angle. In an embodiment, the image marker $M_{110}$ of the first positioning device 110 is different from the image marker $M_A$ of the target anchor point. In an embodiment, the actual size of the image marker $M_A$ of the target anchor point may be obtained by analyzing the image marker $M_A$ of the target anchor point by the first positioning device 110. For example, the image marker $M_A$ of the target anchor point contains the actual size information of the image marker $M_A$, the first positioning device 110 may analyze the image marker $M_A$ of the target anchor point to obtain the actual size. In an embodiment, the actual size of the image marker $M_A$ of the target anchor point is known, such as stored in the first positioning device 110. Alternatively, the first positioning device 110 may obtain the related data from a remote server. In an embodiment, the first positioning device 110 may determine the distance between the first positioning device 110 and the target anchor point according to the actual size of the image marker $M_A$ of the target anchor point and the size of the image marker $M_A$ detected by the first positioning device 110. In an embodiment, the first positioning device 110 may determine the relative orientation and/or rotation angle between the first positioning device 110 and the target anchor point according to the angle information of the positioning unit 111 and/or the camera unit 112 relative to the target anchor point. In an embodiment, the identification information of the target anchor point is known, for example, stored in the first positioning device 110. Alternatively, the first positioning device 110 may obtain the related data from a remote server. In an embodiment, the identification information of the target anchor point may be obtained by analyzing the image marker $M_A$ of the target anchor point by the first positioning device 110. For example, the image marker $M_A$ of the target anchor point contains the identification information of the target anchor point. The first positioning device 110 may analyze the image marker $M_A$ of the target anchor point to obtain the identification information of the target anchor.

In step S120, the first positioning device 110 outputs the image marker $M_{110}$ and the additional information that includes the first pose information. As shown in FIG. 3, the first positioning device 110 may output an additional information including the first pose information through the display unit 115, and this additional information is displayed on the display unit 115 in the form of a two-dimensional code image $I_{110}$. For example, the two-dimensional code image $I_{110}$ may be a quick response code (QR code), which may be captured or scanned to obtain the contained first pose information. In an embodiment, the communication unit 113 may also be configured to output additional information including the first pose information, such as uploading to a server or sending to the second positioning device 120 through the communication unit 113. In an embodiment, the additional information of the first positioning device 110 includes the identification information (such as reference number) of the target anchor point, the identification information of the first positioning device 110 (such as identification code), the identification information of the image marker $M_{110}$ (such as identification code), the size information of the image marker $M_{110}$ (for example, including information such as the length, width and/or diagonal length of the image marker $M_{110}$) and/or the relative individual or accumulating pose information among a plurality of the first positioning devices 110.

In step S130, perform detecting the image marker $M_{110}$ output by the first positioning device 110 and receiving an additional information (in the form of a two-dimensional code image $I_{110}$) by the second positioning device 120, and obtaining a second pose information of the second positioning device 120 relative to the first positioning device 110 according to the image marker $M_{110}$. As shown in FIG. 3, the second positioning device 120 is located in the first positioning space V, and the second positioning device 120 may detect the image marker $M_{110}$ displayed by the first positioning device 110 outside the first positioning space V along the orientation D2 through its camera unit 122.

Moreover, the computing unit 124 is configured to obtain the second pose information of the second positioning device 120 relative to the first positioning device 110 according to the image marker $M_{110}$. In an embodiment, the second pose information includes an information such as the position coordinate and rotation angle. In an embodiment, the second positioning device 120 may scan, detect or capture the two-dimensional code image $I_{110}$ along the orientation D2 through its camera unit 122 to obtain the first pose information. In an embodiment, the communication unit 123 of the second positioning device 120 receives the additional information transmitted by the first positioning device 110 to obtain the first pose information. In an embodiment, the communication unit 123 of the second positioning device 120 receives the additional information uploaded to the server by the first positioning device 110 to obtain the first pose information.

In step S140, perform obtaining a positioning-pose information of the second positioning device 120 in the first positioning space V by the second positioning device 120 through a positioning means. For example, the second positioning device 120 may obtain the positioning-pose information of the second positioning device 120 in the first positioning space V through its positioning unit 121 using Motion Capture. In an embodiment, the positioning means used by the second positioning device 120 in the first positioning space V is different from the image marker detection method used by the second positioning device 120 for the first positioning device 110 outside the first positioning space V.

In step S150, perform obtaining a target pose information of the target anchor point A relative to the first positioning space V according to the first pose information, the second pose information and the positioning-pose information by the second positioning device 120. In detail, the second positioning device 120 may use its computing unit 124 to obtain the target pose information of the target anchor point A relative to the first positioning space V according to the first pose information, the second pose information and the positioning-pose information. For example, the computing unit 124 may perform a accumulation calculation of the first pose information, the second pose information and the positioning-pose information through a spatial coordinate transformation to obtain the target pose information. In an embodiment, the relative position information of the target anchor point A relative to the second positioning device 120 may be obtained according to the relative position information of the first positioning device 110 relative to the target anchor point A in the first pose information and the relative position information of the second positioning device 120 relative to the first positioning device 110 in the second pose information. Then, the position information of the target anchor point A (for example, the coordinate in the first positioning space V) positioned by the positioning means of the first positioning space V may be obtained according to the positioning-pose information of the second positioning device 120, the position information of the second positioning device 120 in the first positioning space V (for example, the coordinate in the first positioning space V) and the relative position information of the target anchor point A relative to the second positioning device 120. In an embodiment, the relative rotation angle information of the target anchor point A relative to the second positioning device 120 may be obtained according to the relative rotation angle information of the first positioning device 110 relative to the target anchor point A in the first pose information and the relative rotation of the second positioning device 120 relative to the first positioning device 110 in the second pose information. Then, the relative rotation angle information of the target anchor point A relative to the second positioning device 120 may be obtained according to the rotation angle information of the second positioning device 120 in the first positioning space V of the positioning-pose information of the second positioning device 120 and the rotation angle information of the target anchor point A positioned by the positioning means in the first positioning space V.

Figure 4:
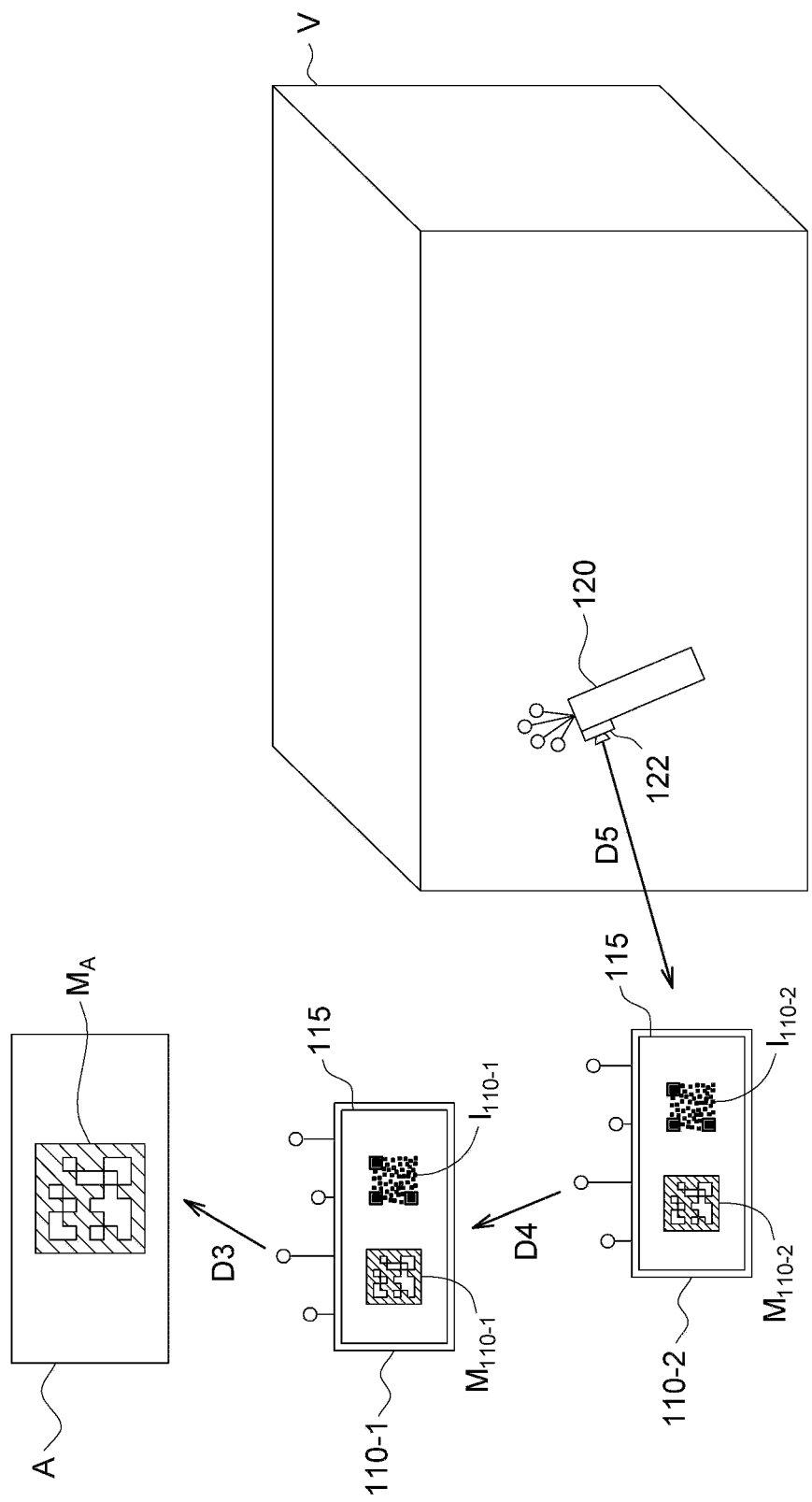
FIG. 4 is an application diagram of the positioning method according to another embodiment of the present disclosure.

Please refer to FIG. 4, FIG. 4 shows an application diagram of a positioning method according to another embodiment of the present disclosure. In this embodiment, the number of first positioning devices located outside the first positioning space may be plural, taking the two first positioning devices 110-1 and 110-2 as an example, with the second positioning device 120, to describe the corresponding positioning method.

As shown in FIG. 4, the first positioning device 110-1, the first positioning device 110-2 and the target anchor point A are all located outside the first positioning space V. The structure and arrangement of the first positioning device 110-1 and the first positioning device 110-2 may be the same or similar to the aforementioned first positioning device 110.

First, use the first positioning device 110-1 to detect the target anchor point A along the orientation D3, so as to obtain the first pose information of the first positioning device 110-1 relative to the target anchor point A. Next, the first positioning device 110-1 outputs the image marker $M_{110-1}$ and an additional information including the first pose information (such as the two-dimensional code image $I_{110-1}$). Then, use the first positioning device 110-2 to detect the image marker $M_{110-1}$ of the first positioning device 110-1 along the orientation D4 and receive the additional information of the first positioning device 110-1, and a third pose information of the first positioning device 110-2 relative to the first positioning device 110-1 is obtained according to the image marker of the first positioning device 110-1. Then, the first positioning device 110-2 outputs the image marker $M_{110-2}$ and an additional information (such as the two-dimensional code image 1110-2) including the first pose information and the third pose information. In an embodiment, this additional information includes the accumulation information of the first pose information and the third pose information. For example, the computing unit of the first positioning device 110-2 obtains the relative position and/or rotation angle information of the target anchor point A relative to the first positioning device 110-2 according to the relative position and/or rotation angle information of the first positioning device 110-1 relative to the target anchor point A in the first pose information and the relative position and/or rotation angle information of the first positioning device 110-2 relative to the first positioning device 110-1 in the third pose information. The additional information includes the relative position and/or rotation angle information of the target anchor point A relative to the first positioning device 110-2. In an embodiment, the additional information includes the un-accumulated first pose information and the third pose information. For example, the additional information includes separate first pose information and third pose information. Then, the second positioning device 120 is configured to detect the image marker $M_{110-2}$ of the first positioning device 110-2 along the orientation D5 and receive the additional information of the first positioning device 110-2, and the second pose information of the second positioning device 120 relative to the first positioning device 110-2 may be obtained according to the image marker $M_{110-2}$ of the first positioning device 110-2. Finally, the second positioning device 120 obtains the target pose information according to the second pose information, the positioning-pose information, and the accumulated first pose information and third pose information. In an embodiment, the target pose information may be obtained according to the first pose information, the second pose information, the third pose information, but the first pose information and the third pose information are not accumulated.

Regarding the third pose information, it is the pose information of the second positioning device 120 relative to the first positioning device 110-2. The so-called pose information refers to information such as position coordinate and rotation angles relative to a space. The forms and features of the target anchor point A, the first pose information, and the second pose information are the same or similar to those described above. The forms and features of the image marker $M_{110-1}$ and the image marker $M_{110-2}$ may be the same or similar to the aforementioned image marker $M_{110}$, and the form and features of the additional information are the same as those described above, and will not be repeated here. In the embodiment shown in FIG. 4, multiple first positioning devices (or three or more) may be used to independently generate an image marker and an additional information including the previous first positioning device to relay and combine the pose relative to the target anchor point, and the pose relative to the target anchor point may be transmitted to the second positioning device 120 in the first positioning space V.

In an embodiment, there may be an arrangement relationship between the display unit and the camera unit of the first positioning device. For example, there is an arrangement relationship between the display unit 115 of the first positioning device 110-1 and the camera unit 112. If it is desired to obtain relevant information about this arrangement relationship, the camera unit 112 of the first positioning device 110-2 may be used to detect (such as capture) the image marker $M_{110-1}$ of the first positioning device 110-1 to obtain the pose information of the first positioning device 110-1 relative to the first positioning device 110-2 and add it to the two-dimensional code image $I_{110-2}$. Then, the first positioning device 110-1 and the first positioning device 110-2 are simultaneously detected (such as captured) by the third positioning device, so as to respectively obtain the pose information of the first positioning device 110-1 relative to the third positioning device and the pose information of the first positioning device 110-2 relative to the third positioning device. Then, the pose information of the first positioning device 110-1 relative to the first positioning device 110-2 and the pose information of the first positioning device 110-2 relative to the third positioning device are accumulated with the third positioning device. The distance information between the accumulated pose information and the pose information of the first positioning device 110-1 relative to the third positioning device is used to obtain information about the aforementioned arrangement relationship (such as translation and/or rotation angle). In an embodiment, the third positioning device is, for example, another first positioning device, a second positioning device or other devices capable of performing the above method.

According to the above, an implementation of the present disclosure may combine the pose information of the second positioning device 120 located inside the first positioning space V with the pose information of the first positioning device 110 located outside the first positioning space V, so as to merge the pose information corresponding to the target anchor point A outside the first positioning space V into the first positioning space V, thereby solving the problem that it is difficult to use a single positioning technology to cover all positioning requirements of the required situation.

Figure 5:
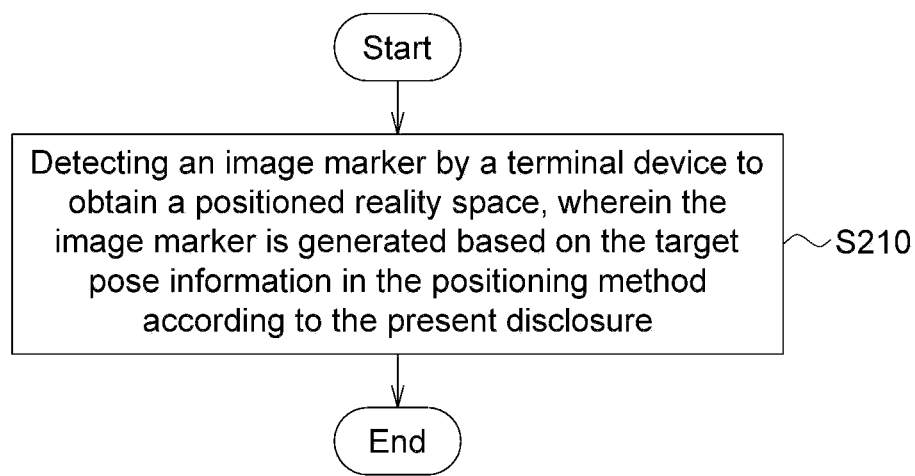
FIG. 5 is a flow chart of the operating method according to an embodiment of the present disclosure.

Please refer to FIG. 5, FIG. 5 shows a flow chart of an operating method S2 applicable to Mixed Reality according to an embodiment of the present disclosure. The operation method S2 includes step S210. A terminal device is used to detect an image marker, and a positioned reality space of Mixed Reality is obtained. For example, the terminal device is an electronic device used by a user, such as a smart phone or a smart pad, which is able to detect an image marker in the form of Fiducial Marker. Moreover, the image marker is generated based on the target pose information in the positioning method applicable to Mixed Reality according to the present disclosure. That is to say, the reality space of the Mixed Reality corresponding to the image marker has been corrected and located by the above-mentioned positioning method, and the user can obtain a correct experience of the reality space on the terminal device by operation of detecting the image marker with the terminal device. In an embodiment, the present disclosure may also be applied to Augmented Reality or Virtual Reality.

While the disclosure has been described and illustrated with reference to specific embodiments thereof, these descriptions and illustrations do not limit the disclosure. It should be understood by those skilled in the art that various changes may be made and equivalents may be substituted without departing from the true spirit and scope of the disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not limitations of the disclosure.

What is claimed is:

1. A positioning method, comprising:
capturing, by a first one of a plurality of first positioning devices, a target anchor point to obtain a first pose information of the first one of the first positioning devices relative to the target anchor point, wherein the first positioning devices and the target anchor point are outside a first positioning space;
outputting, by the first one of the first positioning devices, an image marker and an additional information including the first pose information;
by a second one of the first positioning devices, capturing the image marker of the first one of the first positioning devices and receiving the additional information of the first one of the first positioning devices, as well as obtaining a third pose information of the second one of the first positioning devices relative to the first one of the first positioning devices according to the image marker of the first one of the first positioning devices;
outputting, by the second one of the first positioning devices, an image marker and an additional information including the first pose information and the third pose information;
by a second positioning device being in the first positioning space, capturing the image marker of the second one of the first positioning devices and receiving the additional information of the second one of the first positioning devices;
obtaining, by the second positioning device, a second pose information of the second positioning device relative to the second one of the first positioning devices according to the image marker of the second one of the first positioning devices;
obtaining, by the second positioning device, a positioning-pose information of the second positioning device in the first positioning space through a positioning means different from an image marker capturing means; and
obtaining, by the second positioning device, a target pose information of the target anchor point relative to the first positioning space according to the first pose information, the second pose information, the third pose information and the positioning-pose information.

2. The positioning method according to claim 1, wherein the target anchor point includes an image marker, the first one of the first positioning device captures the image marker of the target anchor point to obtain the first pose information, and the image marker of the first one of the first positioning devices and the image marker of the target anchor point are Fiducial Marker.

3. The positioning method according to claim 1, wherein the positioning means is Motion Capture, and the second positioning device obtains the positioning-pose information by Motion Capture.

4. The positioning method according to claim 1, wherein the additional information output by the second one of the first positioning devices is in a form of a two-dimensional code image, and the second positioning device scans the two-dimensional code image to receive the additional information of the second one of the first positioning devices.

5. The positioning method according to claim 1, wherein the second positioning device downloads the additional information of the second one of the first positioning devices from a server.

6. The positioning method according to claim 1, wherein the additional information output by the first one of the first positioning devices includes an identification information of the target anchor point, an identification information of the first one of the first positioning devices, an identification information of the image marker of the first one of the first positioning devices, a size information of the image marker of the first one of the first positioning devices, or a relative individual or accumulating pose information among the first positioning devices.

7. The positioning method according to claim 1, wherein the second positioning device performs an accumulation calculation of the first pose information, the second pose information, the third pose information and the positioning-pose information through a spatial coordinate transformation to obtain the target pose information.

8. An operating method, comprising:
capturing, by a terminal device, an image marker to obtain a positioned reality space, wherein the image marker is generated based on the target pose information in the positioning method according to claim 1.

9. A positioning method comprising:
by a second positioning device being in a first positioning space, capturing an image marker and receiving an additional information, wherein a plurality of first positioning devices and a target anchor point are outside the first positioning space, and a first pose information of at least one of the first positioning devices relative to a target anchor point is included in the additional information;
obtaining, by the second positioning device, a second pose information of the second positioning device relative to the at least one of the first positioning devices according to the image marker;
obtaining, by the second positioning device, a positioning-pose information of the second positioning device in the first positioning space through a positioning means different from an image marker capturing means;
obtaining, by the second positioning device, a target pose information of the target anchor point relative to the first positioning space according to the first pose information, the second pose information and the positioning-pose information;
capturing, by a second one of the first positioning devices, an image marker of a first one of the first positioning devices to obtain a third pose information of the first one of the first positioning devices relative to the second one of the first positioning devices and add the third pose information in an additional information output by the second one of the first positioning devices;
capturing, by a third positioning device, the first one of the first positioning devices and the second one of the first positioning devices to respectively obtain a pose information of the first one of the first positioning devices relative to the third positioning device and a pose information of the second one of the first positioning devices relative to the third positioning device;

accumulating, by the third positioning device, the pose information of the first one of the first positioning devices relative to the second one of the first positioning devices and the pose information of the second one of the first positioning devices relative to the third positioning device; and
obtaining, by the third positioning device, an information of an arrangement relationship between a camera unit of the first one of the first positioning devices and a display unit of the first one of the first positioning devices according to a distance information between an accumulated pose information and the pose information of the first one of the first positioning devices relative to the third positioning device.

10. The positioning method according to claim 9, comprising:
capturing, by the at least one of the first positioning devices, the target anchor point to obtain the first pose information of the at least one of the first positioning devices relative to the target anchor point; and
outputting, by the at least one of the first positioning devices, the image marker and the additional information.

11. The positioning method according to claim 10, wherein the additional information including the first pose information includes an identification information of the target anchor point, an identification information of the at least one of the first positioning devices, an identification information of the image marker of the at least one of the first positioning devices, a size information of the image marker of the at least one of the first positioning devices, or a relative individual or accumulating pose information among the first positioning devices.

12. The positioning method according to claim 9, wherein the target anchor point includes an image marker, the at least one of the first positioning devices captures the image marker of the target anchor point to obtain the first pose information, and the image marker of the at least one of the first positioning devices and the image marker of the target anchor point are Fiducial Marker.

13. The positioning method according to claim 9, wherein the positioning means is Motion Capture, and the second positioning device obtains the positioning-pose information by Motion Capture.

14. The positioning method according to claim 9, wherein the additional information including the first pose information is in a form of a two-dimensional code image, the second positioning device scans the two-dimensional code image to receive the additional information including the first pose information.

15. The positioning method according to claim 9, wherein the second positioning device downloads the additional information including the first pose information from a server.

16. The positioning method according to claim 9, wherein the second positioning device performs an accumulation calculation of the first pose information, the second pose information, the third pose information and the positioning-pose information through a spatial coordinate transformation to obtain the target pose information.

17. An operating method, comprising:
capturing, by a terminal device, an image marker to obtain a positioned reality space, wherein the image marker is generated based on the target pose information in the positioning method according to claim 9.

* * * * *